United States Patent [19]

Grau

[11] 3,888,390

[45] June 10, 1975

[54] APPARATUS FOR METERING PARTICULATE MATERIAL

[75] Inventor: Theodore H. Grau, Sioux Rapids, Iowa

[73] Assignee: Toledo Stamping & Manufacturing Company, Toledo, Ohio

[22] Filed: June 17, 1974

[21] Appl. No.: 479,982

[52] U.S. Cl. .................. 222/28; 222/37; 222/38; 222/48; 222/70; 222/504; 222/505; 222/561
[51] Int. Cl. ........................ B67d 5/06; B67d 3/00
[58] Field of Search ............ 222/504, 505, 181, 25, 222/26, 27, 28, 32, 33, 36, 38, 48, 70, 222/559, 561

[56] References Cited
UNITED STATES PATENTS

| | | | |
|---|---|---|---|
| 3,036,739 | 5/1962 | Kamysz, Jr. | 222/504 X |
| 3,102,032 | 8/1963 | Lippert | 222/504 X |
| 3,157,313 | 11/1964 | Sarmento et al. | 222/504 X |
| 3,166,219 | 1/1965 | Rudd | 222/70 X |
| 3,184,108 | 5/1965 | Grau | 222/504 X |

*Primary Examiner*—Allen N. Knowles
*Attorney, Agent, or Firm*—Allen D. Gutchess, Jr.

[57] ABSTRACT

Apparatus for metering particulate material is provided, the apparatus being particularly useful to meter a quantity of supplemental material supplied to animal feed or forage. The apparatus includes a bin with a reciprocatable gate having a constant stroke movable across a discharge opening, the size of which can be varied. The reciprocatable gate is driven by a twelve-volt DC windshield wiper motor which can be operated off a tractor battery in the field. The apparatus also employs a valve plate, the position of which relative to the opening can be controlled through a pair of links connected thereto and also through a pivotable adjusting lever which extends outside the bin for manipulation by the operator. The position of the plate determines the quantity of material discharged or metered for each stroke of the gate. The metering apparatus has a sensing device in the bin which is effective to shut off the gate motor if the bin becomes empty. The apparatus also includes a subtraction counter for controlling the length of time the supplemental material is being fed by setting the number of strokes the gate will reciprocate. A cumulative counter is also provided for determining the amount of material discharged over a relatively long period of time.

18 Claims, 7 Drawing Figures

PATENTED JUN 10 1975　　3,888,390

SHEET 1

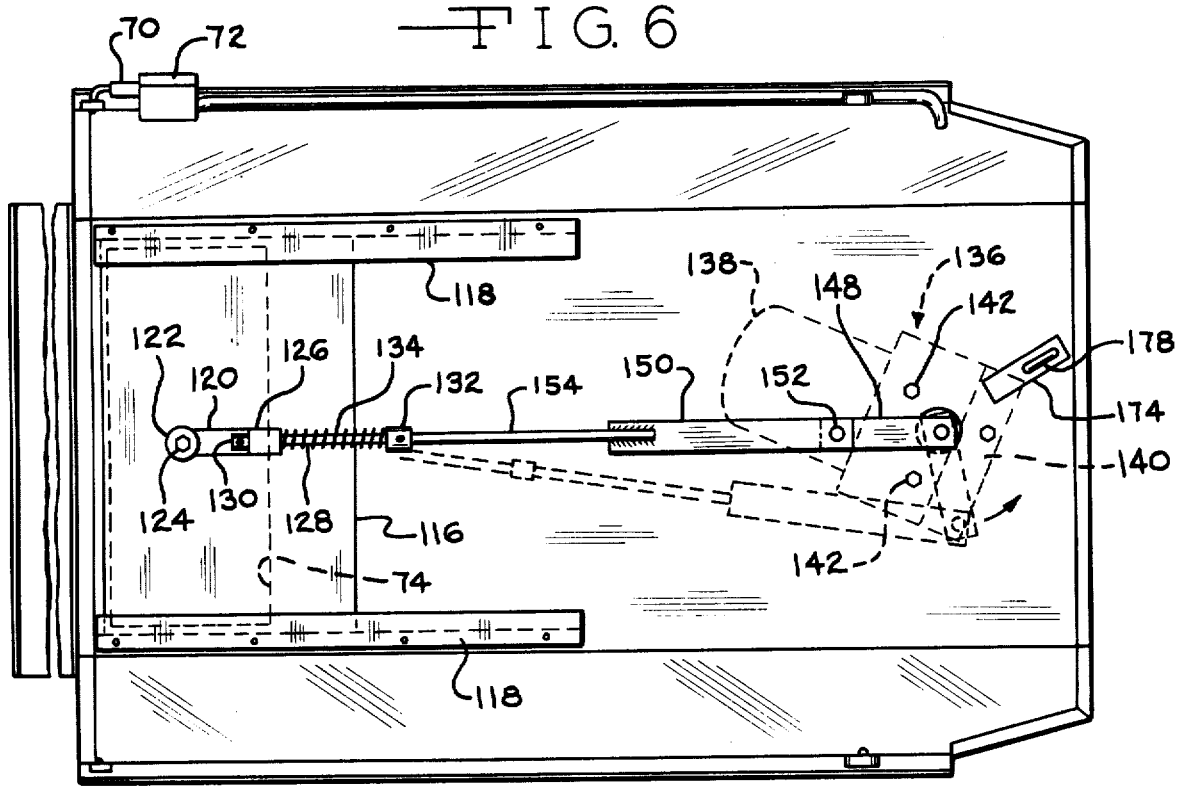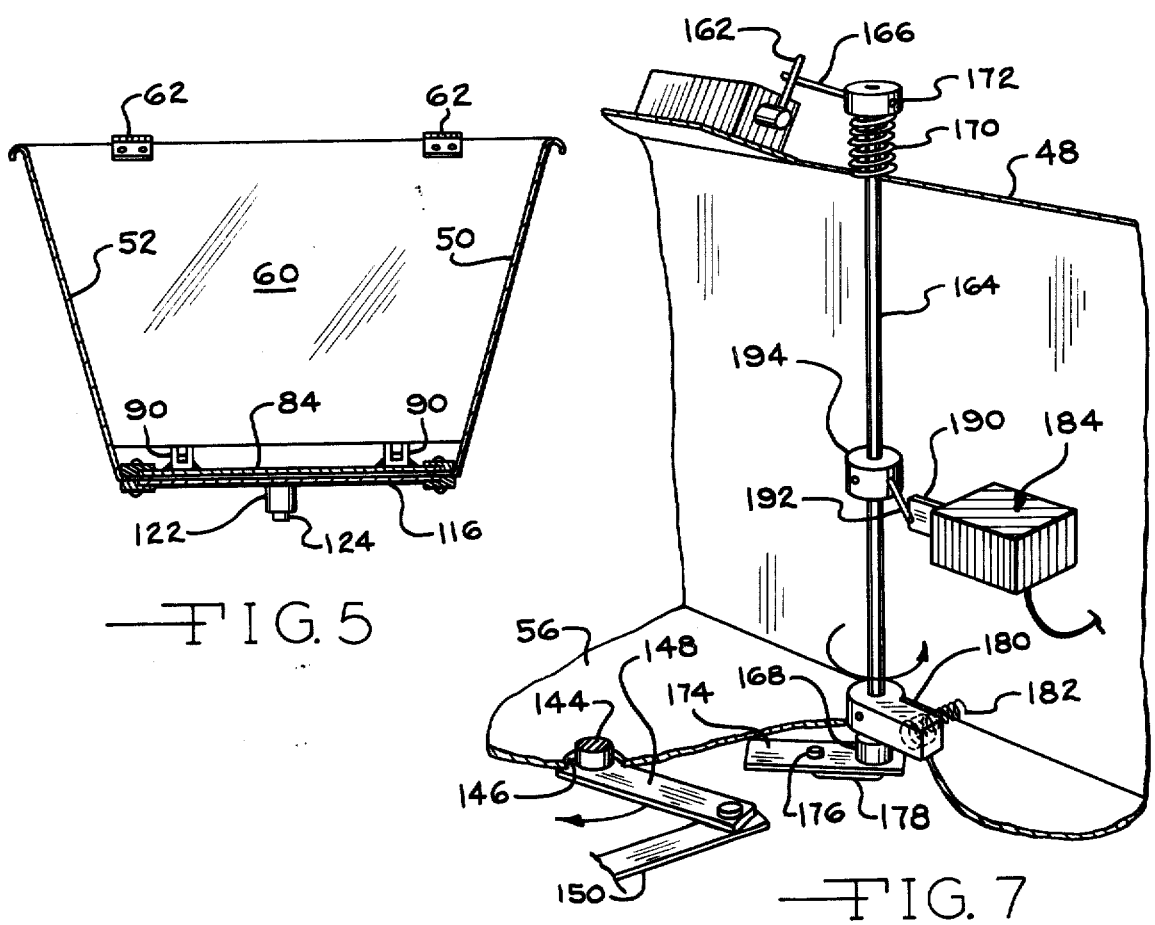

APPARATUS FOR METERING PARTICULATE MATERIAL

This invention relates to apparatus for accurately metering a supplemental material or component for animal feed or forage.

Particularly more recently, the addition of supplemental materials or components to animal feed or forage has become more and more common. The supplemental material usually has been added by hand, with the result that it is not uniformly distributed over the feed, nor is the quantity added known with any degree of accuracy.

Metering devices have heretofore been tried to a limited extent for metering supplemental material to feed or forage. These for the most part have had shortcomings, being quite expensive or requiring a substantial amount of maintenance, by way of example. A common method of metering the supplemental material heretofore has been by reciprocating a gate under an opening of a bin containing the particulate material, with the degree of reciprocation or length of stroke determining the amount of supplemental material discharged from the bin. A meter of this type is disclosed in my U.S. Pat. No. 3,184,108. However, to obtain a sufficient variation in the extent of reciprocation of the gate, relatively complex mechanism has been required in order to assure a reasonably wide range of adjustment.

In accordance with the present invention, metering apparatus for a particulate material is provided which utilizes a bin having an opening in the bottom across which a gate is reciprocated with a stroke of fixed length. The metering is achieved by a sliding valve plate which controls the area of the bin opening, thereby to control the amount of material discharged with each stroke of the gate. The position of the plate relative to the opening is adjusted by a pivotal lever extending outside the apparatus for access by an operator. The gate is driven by a commercially-available, relatively-inexpensive, 12-volt DC windshield wiper drive unit located within a housing of the metering apparatus and having a shaft extending through the bottom wall of the bin to linkage for the gate. This drive arrangement also has the advantage of automatically moving the gate to the closed position when the motor is shut off. The motor can be driven by the 12-volt system of a tractor when in the field. The drive unit is separated from the particulate material in the bin by a diverter plate which can be moved out of the way for access to the drive unit. With the drive unit in the housing, it is less subjected to possible damage and also enables the overall apparatus to be more compact and easier to handle.

The bin has a sensing paddle which controls the operation of the motor of the drive unit to shut off the motor in the event the bin becomes empty. The metering apparatus also has a subtraction counter therein which shuts off the drive motor when reaching zero from a preselected number, to control the number of reciprocatory strokes of the gate. Thus, the quantity of supplemental material discharged from the bin can be controlled by the position of the valve plate to determine the quantity per stroke discharged and by the subtraction counter to determine the overall number of strokes of the gate. A cumulative counter also can be operated by the same mechanism that operates the subtraction counter to provide the farmer or operator with an indication of the overall quantity of material dispensed over a period of time.

It is therefore, a principal object of the invention to provide improved metering apparatus for controlling the quantity of a supplemental or particulate material added to animal feed or forage.

Another object of the invention is to provide metering apparatus employing a bin forming a discharge opening having an adjustable valve plate which can be accurately positioned relative to the opening through an operating lever.

Still another object of the invention is to provide metering apparatus of the type described having a sensing paddle within a bin which is effective to control a drive motor which controls discharge of particulate material from the bin.

Still a further object of the invention is to provide metering apparatus employing a reciprocating gate with a drive motor and mechanism which operates both a subtraction counter and a cumulative counter.

Yet another object of the invention is to provide metering apparatus having a reciprocating gate which is driven by a windshield wiper motor and gear unit located within the apparatus.

Many other objects and advantages of the invention will be apparent from the following detailed description of a preferred embodiment thereof, reference being made to the accompanying drawings, in which:

FIG. 5 is a view in transverse cross section taken along the line 5—5 of FIG. 4;

FIG. 6 is a bottom view of the metering apparatus; and

FIG. 7 is a fragmentary view in perspective of mechanism for operating a subtraction counter and a cumulative counter of the metering apparatus.

Figure 1:
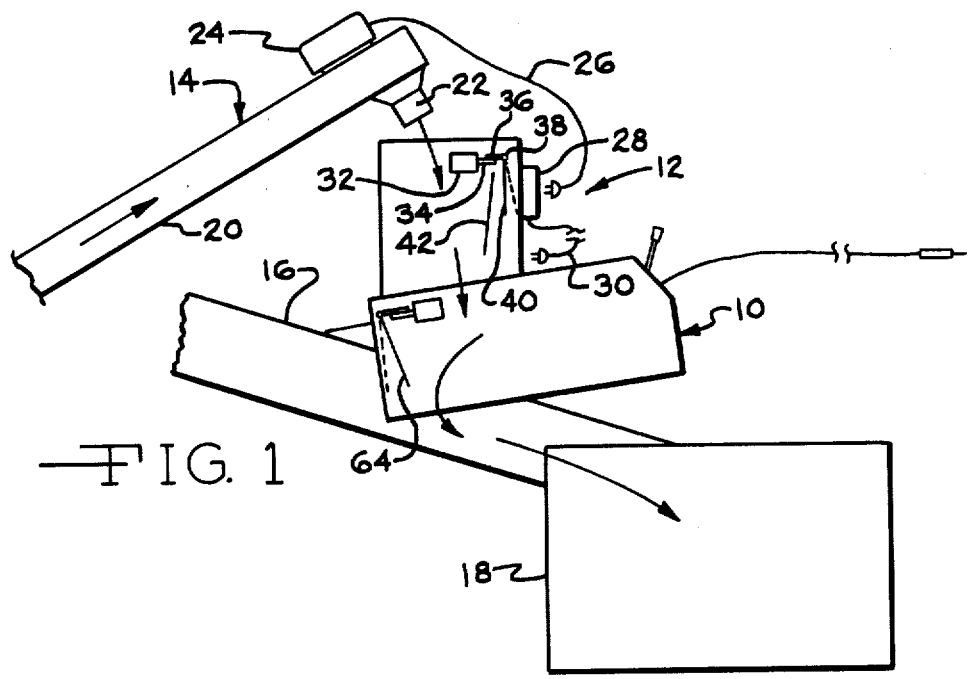
FIG. 1 is a schematic side view in elevation of metering apparatus according to the invention, along with a hopper extension and other feed components.

Referring to FIG. 1, a particulate material metering apparatus according to the invention is indicated at 10 and, in this instance, is provided with a hopper extension 12. Particulate material in the form of a supplemental component for feed or forage, by way of example, is fed to the hopper extension 12 by an auger conveyor 14. The particulate material from the metering apparatus 10 can be discharged in a known, metered amount onto animal feed or forage which is fed down a conveyor 16 to a grinder-mixer 18 or the like. Thus, the amount of the supplemental material, which is usually relatively expensive as compared to the feed or forage, can be accurately determined and controlled. The supplemental material is also uniformly distributed over the feed so that each animal can receive a substantially constant ratio of the supplemental material to the feed. In addition, the supplemental material can be readily varied to provide selected quantities under different conditions, as desired.

The supply conveyor 12 includes a trough 20 containing an auger (not shown) which carries feed or forage up the trough 20 to a discharge spout 22, when driven by a motor 24. The motor 24 has a power line 26 which can be plugged into an electrical outlet box 28 on the hopper extension 12, with the outlet box 28 having a power line 30 which can be connected to a suitable source of power (not shown).

A limit switch 32 is mounted on the side of the hopper extension 12 and is connected with the outlet box 28 and the supply line 30 to control power to the box and, hence, to the auger motor 24. The switch 32 has an operating lever 34 which is positioned to be engaged by an arm 36 connected to a pivot rod 38 extending across the hopper with the rod having a depending sensing plate or paddle 40. The paddle 40 is separated from the spout by a baffle 42 to prevent direct impingement by particulate material discharged from the spout. As the height of the particulate material in the hopper extension 12 increases, it presses against the paddle 40 which moves to the dotted line position. This causes the arm 36 to depress the switch lever 34 to open the switch 32 and shut off power to the auger motor 24. As the level of the particulate material lowers and clears the paddle 40, the paddle swings back to the solid line position to close the switch 32 and operate the motor 24 once again. The switch 32 has an internal spring which urges the operating lever 34 upwardly to urge the paddle 40 toward the solid line position. By keeping the level of the particulate material within a desired range, a relatively constant "head" of the material is maintained and a more consistent discharge from the metering apparatus 10 is thereby achieved.

Figure 2:
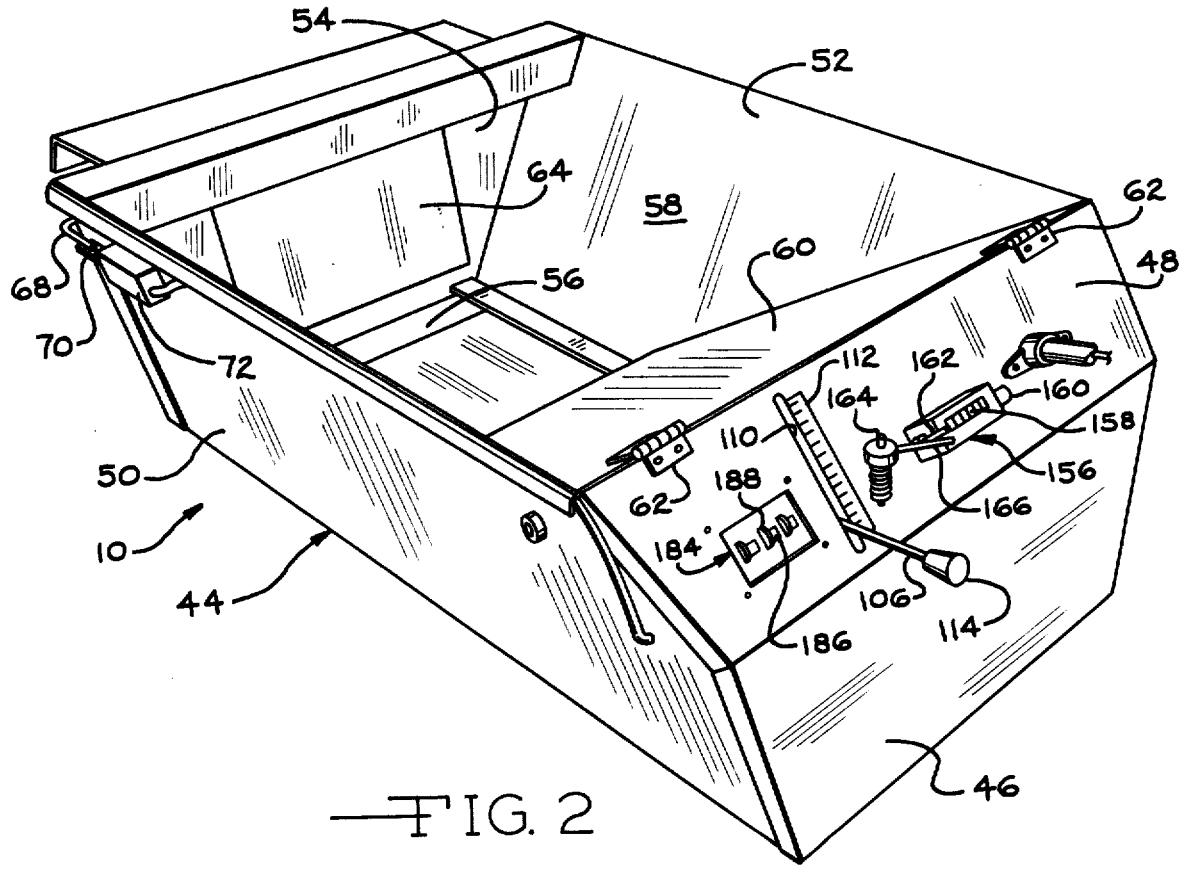
FIG. 2 is a view in perspective of the metering apparatus according to the invention.

Referring more particularly to FIG. 2, the metering apparatus 10 includes an overall housing 44 formed by front walls 46 and 48, slanted side walls 50 and 52, a rear wall 54, and a bottom wall 56. The housing 44 forms a bin 58 through the common side walls 50 and 52, the rear wall 54, the bottom 56, and a diverter plate or partition 60. The latter is hinged to the upper front wall 48 by hinges 62 (see also FIGS. 4 and 5).

The bin 58 also has a sensing paddle or plate 64 therein which depends from a transversely-extending rod 66 (FIGS. 3 and 4) located near the rear wall 54 and pivotally carried by the side walls 50 and 52. The rod 66 has an operating arm 68 (FIGS. 2 and 3) outside the bin and engagable with a switch 72. Under normal conditions, the particulate material in the bin 58 moves the paddle 64 to the dotted line position of FIG. 1 and closes the switch 72 to cause a discharge arrangement for the metering apparatus 10 to operate. If the particulate material level falls below the lower end of the paddle 64, an internal spring of the switch 72 through the lever 70 and the arm 68 moves the paddle 64 back to the solid line position of FIG. 1 and opens the switch 72, stopping operation of the discharge mechanism for the apparatus 10. This prevents the possibility of a false indication to the farmer or operator of the amount of particulate material actually dispensed by the metering apparatus 10.

Figure 3:
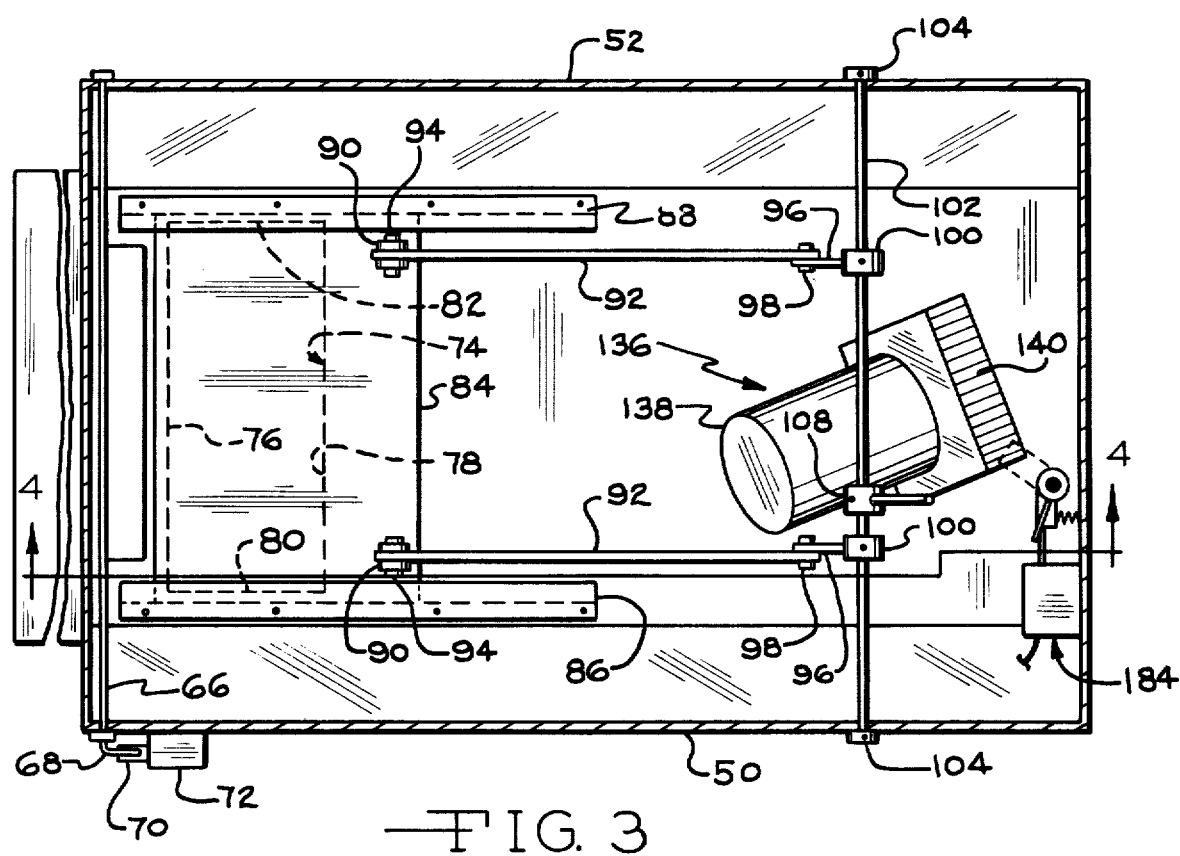
FIG. 3 is a view in horizontal cross section taken through the metering apparatus of FIG. 2.
Figure 4:
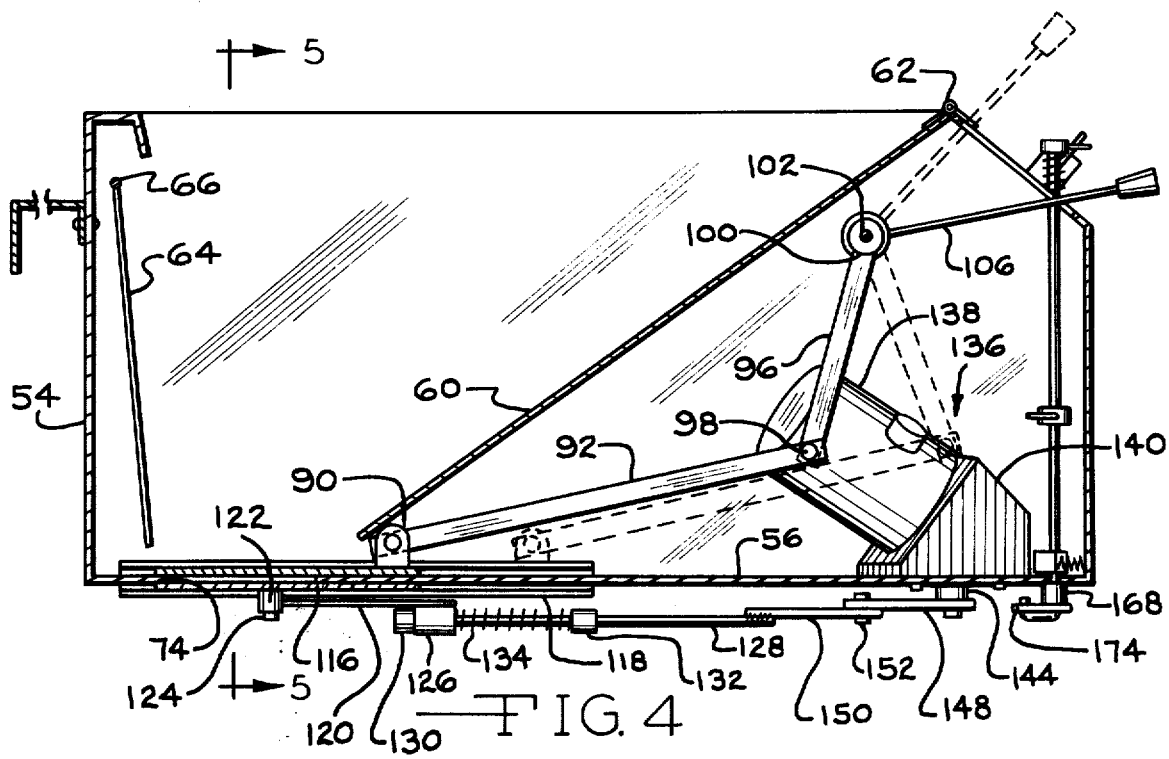
FIG. 4 is a view in longitudinal section taken along the line 4—4 of FIG. 3.

Referring particularly to FIGS. 3–5, the quantity discharge control arrangement for the bin 58 will be discussed. The bottom wall 56 of the bin has an opening 74 therein which has an edge 76 near the rear wall 54, another parallel edge 78 spaced therefrom, and two side edges 80 and 82 near the lower edges of the sidewalls 50 and 52.

A valve plate 84 is located on the upper surface of bottom wall 56 and is slidably mounted in ways or guides 86 and 88 which are located parallelly to the edges 80 and 82 of the opening 74. The width of the valve plate 84 exceeds the width of the opening 74 and the length likewise exceeds the length of the opening. The plate can move in the ways 86 and 88 from a position completely closing the opening 74, as shown in the drawings, to a position spaced from the opening 74, to leave it completely unobstructed.

To adjustably position the plate 84 relative to the opening 74, the plate has a pair of bifurcated ears 90 extending upwardly therefrom and suitably affixed thereto near the edges. Links 92 are pivotally connected to the ears and extend rearwardly at a shallow angle, the links being pivotally connected to the ears 90 by pins 94. The opposite ends of the links 92 are pivotally connected to upwardly-extending links 96 by pins 98. The links 96 are affixed by collars 100 to an oscillatable shaft 102 extending across the housing 44 and through the side walls 50 and 52 where the ends are held by end collars 104. The collars 100 are affixed to the shaft 102 by set screws or the like and rotate when the shaft 102 is rotated to pivot the links 92 and the plate 84. The shaft 102 is oscillated on its axis by an adjusting lever 106 which is affixed to the shaft by a collar 108 (FIG. 3) and extends outwardly through a slot 110 (FIG. 2) in the front wall 48 of the housing 44. A calibrated scale 112 is located adjacent the slot 110 on the front wall 48 so that the lever 106 can be moved by an operator through a knob 114 to a desired position relative to the scale 112. Through previous measurements or calibrations, the operator knows the discharge rate of the particulate material from the measuring apparatus 10 when the lever 106 is located adjacent particular settings of the scale 112.

A discharge gate 116 is located adjacent the lower surface of the bottom wall 56 of the bin and is of a size similar to the adjustable valve plate 84. The gate 116 is mounted in guides or ways 118 (FIGS. 4 and 6) affixed to the bottom wall 56 near the lower edges of the side walls 50 and 52. The gate 116 is reciprocated through strokes of fixed length such that the forward edge of the gate 116 extends beyond the edge 76 of the opening 74 when at one end of the stroke, and with the forward edge being near the edge 78 of the opening 74 at the other end of the stroke.

In order to cause reciprocation of the gate 116, a bar 120 has an ear or eye 122 pivotally connected to the gate 116 by a fastener 124. The opposite end of the bar 120 terminates in a tubular projection 126 which slidably receives an end of a linking rod 128 extending therethrough to a collar 130. The rod 128 has a second collar 132 spaced from the tubular projection 126 with a spring 134 located between the collar 132 and the tubular projection 126. When the linking rod 128 is moved forwardly or toward the left as viewed in FIGS. 5 and 6, the spring 134 engages the tubular projection 126 and pushes the bar 120, along with the gate 116 toward the closed position. When the link 128 is moved in the opposite direction or toward the right, the collar 130 engages the tubular projection 126 directly and moves the gate 116 toward the right to clear the opening 74. This connection for the gate 116 enables the spring 134 to be compressed as the gate moves toward the closed position so that the gate can stop while the drive linkage continues to move, in the event some obstruction should be caught in the opening 74, as between the forward edge of the gate 116 and the edge 76 of the opening.

The linking rod 128 and the gate 116 can be reciprocated by a windshield wiper drive unit 136. This is a commercially-available unit which includes an electric 12-volt DC motor 138 and a suitable gear and control unit 140 forming a part thereof. The drive unit 136 is located within the housing 44 but outside the bin 58, being separated by the partition 60. By locating the unit within the housing, it is not subjected to damage and the overall metering apparatus 10 is more compact and easier to handle. The drive unit 136 can be mounted on the upper surface of the bottom wall 56 by suitable fasteners 142 (FIG. 6) and has a drive shaft 144 extending downwardly through an opening 146 (see FIG. 7 also) in the bottom wall 56. A crank arm 148 is affixed to the drive shaft 144 and rotates therewith, below the bottom wall 56 and the fasteners 142. A link extension 150 is pivotally connected to an end of the crank arm 148 by a pin 152 and the opposite end of the link extension is affixed to the linking rod 128 by a weld 154. When the motor 138 is driven, the drive shaft 144 is rotated to rotate the crank arm 148 to reciprocate the link extension 150 and the linking rod 128, to correspondingly move the gate 116. The length of the stroke of the gate 116 is equal to twice the distance between the pivot pin 152 and the drive shaft 140.

The commercially-available unit 136 provides a relatively low cost and maintenance-free drive for the gate 116 and further has the built-in feature that whenever the motor 138 is shut off, the gate 116 is automatically moved back to the closed position, as shown in FIG. 6, for example. Thus, there is no possibility that the opening 74 in the bottom wall 56 will be left partially open upon termination of the operation which could undesirably discharge any remaining contents in the bin 58.

Supplemental material or other particulate material discharged from the bin 58 upon each complete reciprocatory cycle of the gate 116 depends upon the position of the valve plate 84. Again, the scale 112 on the wall 48 enables the operator to know the position of the valve plate and the amount of feed that will be discharged for each reciprocatory cycle of the gate. If the operator then knows the number of reciprocations completed, he will know the total amount of supplemental material supplied to the forage or feed at any particular time.

In order for the operator to know the number of reciprocations, the metering apparatus 10 is equipped with counters mounted on the apparatus. A cumulative counter 156 is mounted on the upper forward wall 48 of the housing 44 and includes a window 158 through which suitable dials indicate the number of cycles made by the gate 116. The counter has a reset knob 160 and an actuating arm 162 which advances the counter dials one digit upon each oscillating cycle thereof.

The actuating arm 162 of the counter 156 is operated through an upright counter rod or elongate member 164 extending upwardly through the forward wall 48 and having a transverse arm 166 which engages the actuating arm 162. As shown particularly in FIGS. 4 and 7, the rod 164 extends generally vertically through the housing 44 and through the bottom wall 56 where a collar or enlargement 168 is located. The collar 168 bears against the lower surface of the bottom wall 56 by virtue of a coil spring 170 maintained in compression between the forward wall 48 and a collar 172 at the upper end of the rod 164 from which the arm 166 extends. An actuating arm 174 extends outwardly from the lower collar 168 and receives a short projection 176 at an end of a transverse portion 178 of the rod 164. This assures that the rod 164 will oscillate with the arm 174. As shown in FIG. 6, the arm 174 is located in the circular path of the link 148 and is engaged thereby and swung out of the way during each rotation of the link 148. The rod 164 has a return arm 180 which urges the rod 164 in a counter-clockwise direction, as viewed from above, by means of a coil spring 182 located in tension between the return arm 180 and the lower forward wall 46 of the housing.

A commercially-available counter 184, of the subtraction type, also is operated by the rod 164. The counter 184 has dials showing through a window 186 (FIG. 2) through which the number of cycles desired for the gate 116 is set by means of sprocket wheels 188 extending beyond the dials. During each complete cycle of the gate 116, the counter number is reduced by one and when the number reaches zero, a switch in the counter is opened. This switch is connected in series with the motor 138 and causes the motor to turn off when the counter reaches zero. The counter 184 has an arm 190 which is engaged by a transverse arm 192 mounted on the rod 164 by a collar 194 to energize the counter upon each oscillation of the shaft. The counter can be energized by built in electrical or mechanical means. Thus, for each rotation of the arm 148 and reciprocation of the gate 116, the cumulative counter 156 advances one digit and the subtraction counter 184 decreases one digit.

Various modifications of the above described embodiment of the invention will be apparent to those skilled in the art and it is to be understood that such modifications can be made without departing from the scope of the invention, if they are within the spirit and the tenor of the accompanying claims.

I claim:

1. Metering apparatus for metering a quantity of particulate material, said metering apparatus comprising a housing forming a bin for receiving the particulate material, said bin having a bottom wall defining an opening therein, a gate slidably mounted on said bottom wall in a position for reciprocation across said opening, a windshield wiper drive mounted on said bottom wall within said housing, said drive comprising a DC motor and a gear unit, said gear unit having a drive shaft extending therefrom through said bottom wall, means connecting said drive shaft and said gate to cause said gate to reciprocate relative to said opening when said drive shaft is rotated, with said gate returning to a closed position closing off said opening when power to said motor is shut off.

2. Metering apparatus according to claim 1 characterized by said gate being slidably mounted on the lower surface of said bottom wall outside said bin, a valve plate mounted on the top surface of said bottom wall within said bin, a pair of links connected to said valve plate, and an adjusting lever connected to said links and extending outside said housing for access by an operator.

3. Metering apparatus according to claim 2 characterized by said housing having a slot through which said adjusting lever extends, and means forming a scale adjacent said slot.

4. Metering apparatus according to claim 1 characterized by a diverter plate in said housing for separating said windshield wiper drive from particulate material in said bin, said diverter plate being movable for access to said drive.

5. Metering apparatus according to claim 1 characterized by pivotal shaft means extending upright in said housing and having a portion extending into the path of said means connecting said drive shaft and said gate to cause said shaft means to oscillate when said connecting means rotates, a counter, and means engagable with a portion of said shaft means to actuate said counter each time the shaft means is oscillated.

6. Metering apparatus according to claim 5 characterized by an additional counter, said shaft means having means for operating said additional counter each time said shaft means is oscillated.

7. Metering apparatus according to claim 6 characterized by said counter being of the subtraction type and said additional counter being of the cumulative type, said subtraction counter being effective to shut off said DC motor after a selected number of reciprocations of said gate.

8. Metering apparatus for metering a quantity of particulate material, said metering apparatus comprising a housing forming a bin for receiving the particulate material, said bin having a bottom wall defining a fixed opening therein, a gate slidably supported by said bottom wall in a position for reciprocation relative to said opening, means for reciprocating said gate, a valve plate slidably supported by said bottom wall for movement relative to said opening such that in one extreme position of said valve plate, the opening is substantially closed and in another extreme position of said valve plate, the opening is substantially unobstructed, an elongate member supported by said housing in a position transverse to the direction of movement of said valve plate, first link means pivotally connected to said valve plate and having a spaced portion connected to said elongate member for movement therewith, and a lever affixed to said elongate member and extending out of said housing for manipulation by an operator to rotate said elongate member on its axis and to change the position of said valve plate.

9. Metering apparatus according to claim 8 characterized by said housing having a scale positioned near a portion of said lever so that the position of said valve plate, as determined by the position of said lever, can be more fully ascertained by the operator.

10. Metering apparatus according to claim 8 characterized by said link means comprises a first link pivotally connected to said valve plate, and a second link having a portion pivotally connected to a portion of said first link spaced from said valve plate and having another portion affixed to said elongate member.

11. Metering apparatus according to claim 10 characterized by there being a pair of said first links and a pair of said second links in parallel relationship.

12. Metering apparatus according to claim 8 characterized by said reciprocating means being located in said housing, and a partition separating said reciprocating means from said bin.

13. Metering apparatus according to claim 12 chracterized by said reciprocating means comprising a windshield wiper drive unit.

14. Metering apparatus according to claim 13 charterized by said drive unit having a drive shaft extending through said bottom wall, and link means connecting said drive shaft and said gate.

15. Metering apparatus according to claim 14 characterized by said link means includes yieldable means for urging said gate toward the closed position.

16. Metering apparatus according to claim 8 characterized by said reciprocating means comprises an electric motor, said metering apparatus further comprising a subtraction counter electrically connected to said motor, and means for actuating said counter upon each reciprocatory movement of said gate, said counter shutting off said motor after a selected number of reciprocations.

17. Apparatus according to claim 16 characterized further by an additional, cumulative counter, and means for actuating said cumulative counter upon each reciprocatory movement of said gate to advance said cumulative counter one digit.

18. Metering apparatus according to claim 17 characterized further by said means for operating said subtraction counter and said means for operating said cumulative counter include common means.

* * * * *